United States Patent [19]

Sich et al.

[11] Patent Number: 5,339,930
[45] Date of Patent: Aug. 23, 1994

[54] CONSTANT TENSION DEVICE FOR RAILWAY CAR HANDBRAKE

[75] Inventors: Gary M. Sich, Irwin, Pa.; Wajih Kanjo, Lockport, Ill.

[73] Assignee: Westinghouse Air Brake Company, Wilmerding, Pa.

[21] Appl. No.: 888,090

[22] Filed: May 26, 1992

[51] Int. Cl.[5] ............................................. F16D 65/18
[52] U.S. Cl. ................................... 188/210; 188/216; 267/162; 267/168
[58] Field of Search ............ 188/210, 209, 217, 223.3, 188/223.6, 224.1, 124, 125, 166, 169; 267/73, 162

[56] References Cited

U.S. PATENT DOCUMENTS

| | | | |
|---|---|---|---|
| 323,659 | 8/1885 | Gathright | 188/168 |
| 1,229,314 | 6/1917 | Norberg | 188/210 |
| 1,674,831 | 6/1928 | Lounsbury | 188/216 |
| 2,184,690 | 12/1939 | Varga | 188/210 |
| 2,954,105 | 9/1960 | Massey | 188/210 |
| 3,454,141 | 7/1969 | Guerrini | 188/210 |
| 3,466,024 | 9/1969 | Spieth | 267/162 |
| 3,873,079 | 3/1975 | Kuus | 267/162 |
| 3,918,301 | 11/1975 | Baer | 267/162 |
| 4,456,233 | 6/1984 | Müller | 267/162 |

Primary Examiner—Matthew C. Graham
Attorney, Agent, or Firm—Gary J. Falce

[57] ABSTRACT

A constant tensioning device in the form of an elastic member interposed in the handbrake chain between a railway car handwheel and a handbrake lever of the railway car brake apparatus for maintaining tension in the handbrake chain in accordance with the applied handbrake force, irrespective of such shifting of the railway car relative to its truck, as would otherwise cause slack to develop in the handbrake chain and thereby cause an undesired loss of handbrake force.

9 Claims, 4 Drawing Sheets

1

CONSTANT TENSION DEVICE FOR RAILWAY CAR HANDBRAKE

BACKGROUND OF THE INVENTION

The present invention is related to handbrakes for railway cars and in particular to a handbrake tensioning member that compensates for slack in the handbrake system, in order to prevent undesired loss of the handbrake application force.

Traditional railway car handbrake systems employ a car mounted handwheel device to which one end of a handbrake chain is connected. The other end of the handbrake chain is connected to a handbrake lever via which the car brakes are applied in a well-known manner.

Railway car handbrakes are employed to hold a car or cut of cars on the siding when removed from a train, since the automatic air brake becomes ineffective over a period of time due to the car air pressure gradually leaking off. There have been incidences of such parked cars running away, even though their handbrakes were properly applied. Such incidences have occurred on cars with truck mounted brakes and are attributed to relative movement between the car body and truck, which results in handbrake chain slack and a loss of chain tension, with consequent loss of handbrake force. While a certain minimal amount of relative movement between the car body and truck is normal, it can be exacerbated by wear of the interface components via which the car body is mounted on the truck, as for example the car center plate, the center plate bowl on the bolster and/or the center plate wear liner. While handbrake forces are normally insufficient to effect any relative movement between the car body and truck under static conditions of friction therebetween, as normally exists at the time a handbrake application is made, tests have shown that vibration forces in a railway environment are strong enough to "break" away this static friction, so that the handbrake force becomes effective to gradually shift the car body relative to the truck and accordingly reduce the handbrake chain tension sufficiently to release or significantly reduce the applied handbrake force.

SUMMARY OF THE INVENTION

An object of the present invention, therefore, is to modify a conventional, railway car handbrake system to prevent loss of tension in the handbrake chain irrespective of such conditions as create slack in the handbrake system.

An extension of the foregoing object is to provide an elastic member in the handbrake chain that maintains the handbrake force substantially constant within a predetermined range of displacement corresponding to relative movement between a railway car body and truck.

A final object of the invention is to limit the amount of take-up of the handbrake chain required to achieve the desired handbrake force when employing an elastic member in the handbrake chain.

Briefly, there is provided in accordance with the foregoing objectives, an elastic device in the handbrake chain of a truck mounted brake for a railway car having a handwheel device to which one end of the handbrake chain is connected and a handbrake lever to which the other end of the handbrake chain is connected.

The elastic device is compressed in response to tensioning of the handbrake chain when the handwheel is operated to apply the handbrake force, and maintains such tension over a subsequent predetermined range of expansion thereof, due to relative movement between the car body and truck, for example, to maintain the handbrake force substantially constant.

BRIEF DESCRIPTION OF THE DRAWINGS

These and other objects and advantages of the invention will become apparent from the following more detailed explanation when taken in conjunction with the attendant drawings in which.

DESCRIPTION AND OPERATION

Figure 1:
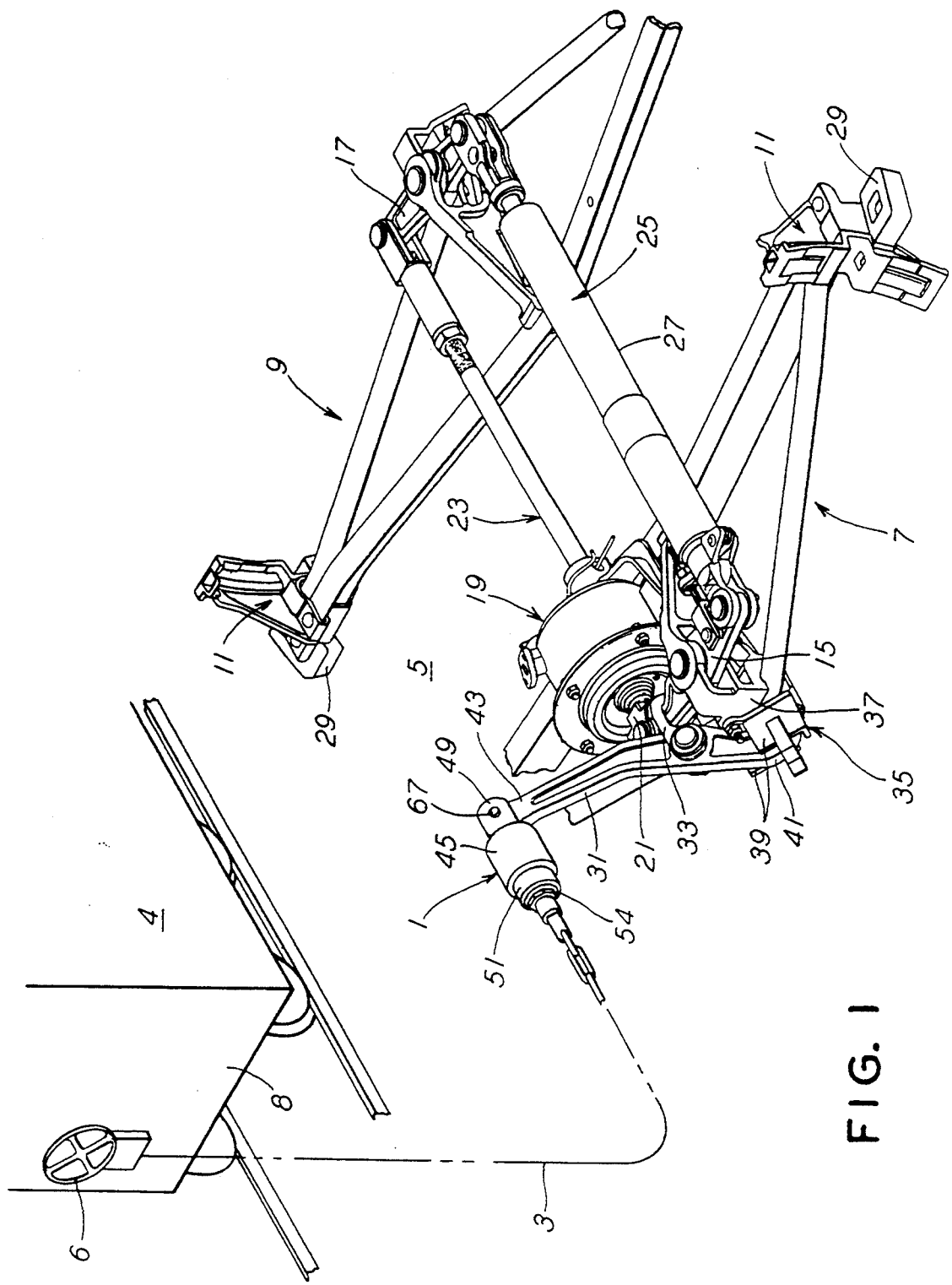
FIG. 1 is an axonometric view showing the tensioning device of the present invention connected between one end of the handbrake chain and the handbrake lever of a truck mounted brake assembly.

In accordance with the present invention, there is shown in FIG. 1 a tensioning device 1 in the handbrake chain 3 of a railway car 4. Handbrake chain 3 is connected to a handwheel device 6 mounted on the body 8 of railway car 4 having a truck-mounted, brake assembly 5, as for example, the truck-mounted brake assembly disclosed in U.S. Pat. No. 5,069,312.

This brake assembly 5 is comprised of a pair of spaced-apart brake beams 7, 9, on the ends of which are mounted brake heads 11 that are adapted to receive brake shoes (not shown) for engagement with the wheel treads of railway car 4. Each brake beam is provided with a transfer lever 15, 17 that is pivotally mounted intermediate its ends to the midpoint of a respective brake beam 7, 9. A pneumatic brake cylinder or actuator 19 is mounted on brake beam 7 with its push rod 21 connected to one end of transfer lever 15. A force transmitting member in the form of a connecting rod 23 is connected between the corresponding one end of transfer lever 17 and the body of brake actuator 19. The corresponding other ends of transfer levers 15, 17 are interconnected through a transmitting member 25, such as a slack adjuster device 27. The brake assembly further includes guide feet 29 formed on the respective brake heads. As is well known, these guide feet are carried in guide channels (not shown) associated with the truck side frame of railway car 4, in order to support the brake assembly 5 on the truck, while maintaining proper alignment of the brake shoes with the wheel treads.

A handbrake lever 31 is connected intermediate its ends to transfer lever 15 by a U-shaped transfer link 33. The lower end of handbrake lever 31 is engageable with a thrust block 35 formed on the end of the strut member 37 of brake beam 7. Angularly disposed parallel side walls 39 of thrust block 35 provide lateral support for handbrake lever 31 at its lower end 41. Interposed between the upper end 43 of handbrake lever 31 and chain 3 is the tensioning device 1.

Figure 2:
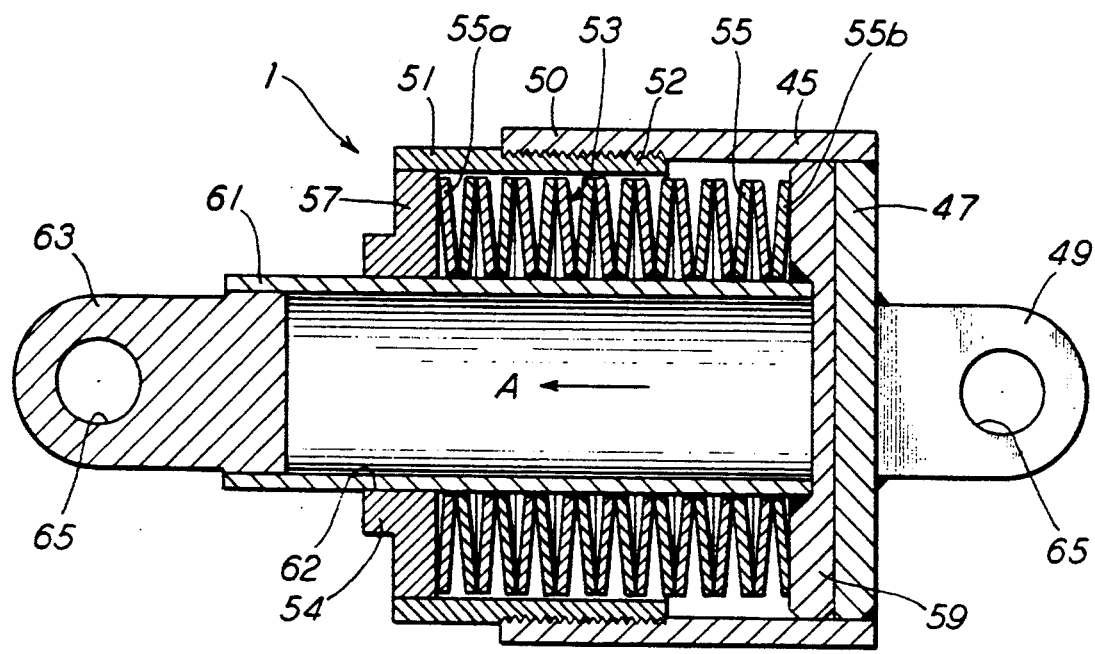
FIG. 2 is a sectional assembly view of a preferred embodiment of the tensioning device of FIG. 1.

As shown in the embodiment of FIG. 2, this tensioning device 1 consists of a cylindrical-shaped outer body 45, to one end of which is welded an end wall 47 having a bifurcated projecting lug 49 that may be formed integral with end wall 47 or affixed thereto, as by welding. The inner surface of outer body 45 is threaded at its open end 50 to receive the open end 52 of a correspondingly threaded body member 51. The threaded engagement between the respective body members 45 and 51, in addition to connecting these body members 45, 51 together, also provides for axial adjustment therebetween, for a purpose hereinafter discussed. The periphery of body member 51 may be formed with a hexagonal shape 54 to accommodate a tool and thereby facilitate such adjustment.

Figure 3:
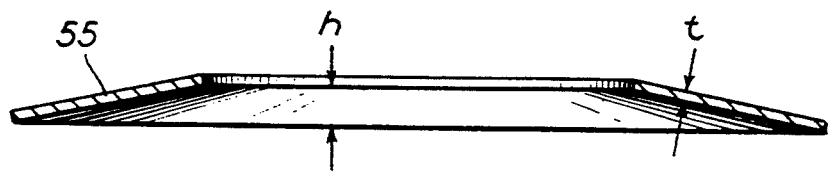
FIG. 3 is an enlarged sectional view of a typical Belleville type disc spring, such as employed in the spring stack of the tensioning device of FIG. 2.

An elastic member 53 is contained within the housing provided by body members 45 and 51. This elastic member is comprised of a plurality of conical-shaped, disc type springs 55, such as well-known Belleville springs, one of which is shown in FIG. 3 in a free state. The plurality of springs are correspondingly sized and shaped such that when stacked together in a series configuration, the respective inner and outer ends of adjacent disc springs 55 are contiguous. Disc spring 55a at one end of the spring stack engages an end wall 57 of body member 51 and the disc spring 55b at the opposite end of the spring stack engages a spring seat 59 that is slidably disposed within cylindrical outer body 45 adjacent end wall 47. A hollow pull rod 61 passes through a guide opening 62 in end wall 57 and the central opening formed between the plurality of disc springs 55 for connection with spring seat 59, as by threads or welding, for example. Welded or otherwise affixed to the end of pull rod 61 external of end wall 57 is a lug 63 having a hole 65 to which chain 3 is connected. Bifurcated lug 49 is provided with a hole 65 to receive a pin 67, for connection to the upper end 43 of handbrake lever 31. Pull rod 61, in addition to transmitting the spring stack force, further provides a close tolerance guide by which means the spring stack alignment is accurately maintained during spring compression.

It is noteworthy to mention, at this point, that in stacking the plurality of disc springs 55 in series, as opposed to parallel relationship, the degree of deflection of the spring stack for a given load can be varied by increasing or decreasing the number of individual springs 55, without concurrently changing the load characteristic of the spring stack, which corresponds to that of a single individual spring disc.

Figure 4:
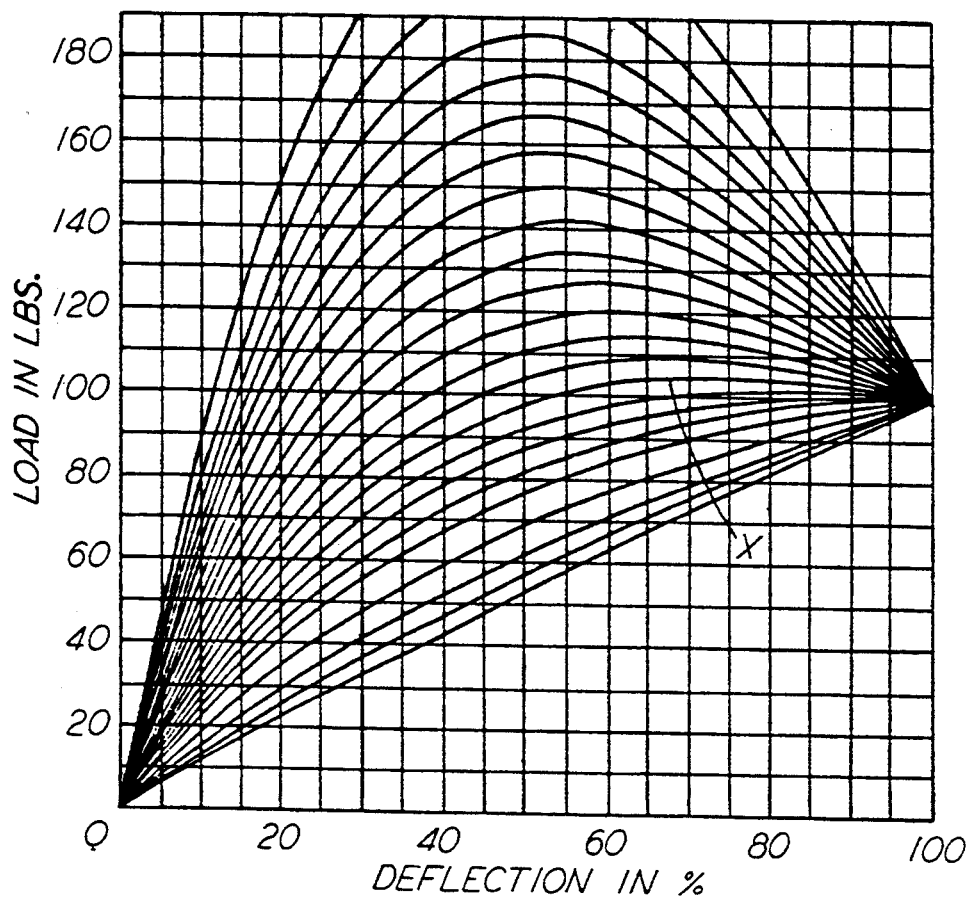
FIG. 4 is a graph showing a series of characteristic load versus deflection curves representing disc type springs having different height versus thickness ratios.

As can be seen from the graph of FIG. 4, the characteristic curve representing the load versus deflection of a conical shaped disc spring can vary considerably depending upon the ratio of its unstressed or free height (h) relative to its thickness (t). The desideratum in the present invention is to employ an elastic member 53 having a range of deflection in which the load characteristic remains substantially constant. For example, the characteristic curve X for a single disc spring in the graph of FIG. 4 exhibits a relatively "flat" region corresponding to spring deflection between approximately 65%-85%, and has a height (h) to thickness (t) ratio of 1.4:1, as shown in FIG. 4. It will be appreciated, therefore, that within this "flat" range of deflection of an individual spring disc 55, the desired load or force capable of being exerted by such spring disc 55 is substantially constant. Employing multiple springs 55 in a series configuration serves to increase the total degree of deflection of the stack of springs without also changing the load.

In the present invention, loss of handbrake chain tension, for which the tensioning device 1 is intended to compensate, results from relative movement between the car body 8 and truck members, as previously explained. Consequently, a plurality of individual disc-type springs 55 comprising elastic member 53 in the embodiment of FIG. 2 are employed to assure that the total deflection of elastic member 53 corresponding to the maximum possible shifting of the car body relative to the truck under the most extreme conditions of component wear will not cause the deflection of the individual disc springs 55 to exceed their desired "constant load" deflection range of 65%-85%. In this manner, excessive car body shifting can be compensated, as hereinafter explained, without any appreciable drop off of the loading or force exerted by springs 55.

When a handbrake application is desired, the car handwheel device 6 is operated in the usual, well-known manner to take up the handbrake chain 3. This in turn acts through tensioning device 1 to effect counter-clockwise rotation of handbrake lever 31 about its lower end 41, which bears against thrust block 35. Transfer link 33 in turn effects counter-clockwise rotation of transfer lever 15 about its connection with brake beam 7. This counter-clockwise rotation of transfer lever 15 results in force-transmitting member 25 being moved in the direction of the right hand to, in turn, effect counter-clockwise rotation of transfer lever 17 about its connection with brake beam 9. In that one end of connecting rod 23 abuts brake actuator 19, the end of transfer lever 17 to which the other end of connecting rod 23 is connected becomes the fulcrum point about which transfer lever 17 rotates. Thus, the handbrake force transmitted via force transmitting member 25 causes transfer lever 17 to pull brake beam 9 in the right-hand direction through its connection with the strut member of brake beam 9.

In consequence of this rightward movement of brake beam 9 causing brake shoe engagement with the wheel treads of brake beam 9, the connection of transfer lever 15 with force-transmitting member 25 becomes solid to provide the fulcrum point about which the counter-clockwise rotation of transfer lever 15 occurs. Accordingly, the handbrake force acts through the connection of transfer lever 15 with brake beam 7 to move brake beam 7 in a left-hand direction and thereby effect brake shoe engagement with the wheel treads associated with brake beam 7.

With tensioning member 1 installed in handbrake chain 3 between one end of the handbrake chain and handbrake lever 31, as shown in FIG. 1, elastic member 53 becomes increasingly compressed following brake shoe/wheel tread engagement, as the handbrake force is increased. This compression of elastic member 53 comes about as a result of spring seat 59 being pulled in the direction of arrow A, as the tension in handbrake chain 3 increases with the applied handbrake force, to in turn effect deflection of the plurality of disc springs 55. At the maximum desired handbrake force, the deflection of each individual disc spring 55 will approach 85% corresponding to the upper limit of its "constant load" range, and the total deflection of elastic member 53 under compression will be the individual spring deflection multiplied by the number of springs 55 employed. In this compressed condition of elastic member 53, spring seat 59 is spaced-apart from end wall 47 and the stored energy of disc springs 55 comprising elastic member 53 provides the tension in handbrake chain 3 and thus establishes the effective handbrake force.

Figure 5:
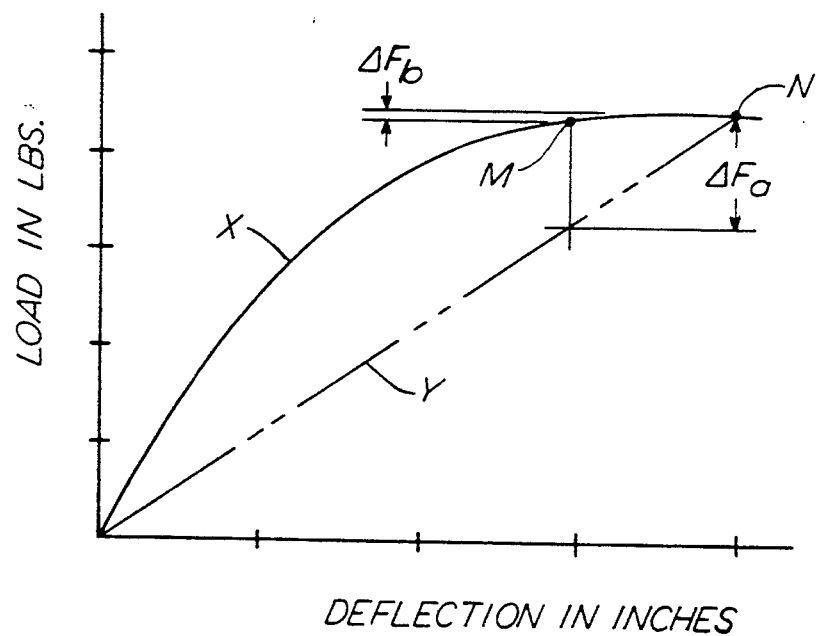
FIG. 5 is a graph showing the load change for a given deflection of a disc type spring employed in the tensioning device of FIGS. 1 and 2, as compared to a helical spring.

In the event the car body 8 on which the handwheel 6 is mounted subsequently shifts relative to the car truck on which brake assembly 5 is mounted, due to the force exerted by the handbrake application, thereby tending to cause slack in the handbrake chain, elastic member 53 under compression will automatically expand to take up such slack and maintain the handbrake chain tension relatively constant. This tension in handbrake chain 3 is held relatively constant by reason of the non-linear, load versus deflection characteristic of disc springs 55, as represented by curve X in the graph of FIG. 5. Due to the plurality of springs 55 comprising elastic member 53, the expansion of elastic member 53 required to compensate the shifting of a car body relative to its truck limits the deflection of the individual disc springs 55 to not less than 65% corresponding to the lower limit of the "constant load" range. It will be appreciated therefore that elastic member 53 operates during a handbrake operation such that the individual disc spring deflection remains within the desired 65%-85% "constant load" range corresponding to points M and N in the graph of FIG. 5 irrespective of such shifting of the car body as may occur. Within this ideal, relatively constant load range of the individual disc springs 55, the load change $\Delta Fb$ is relatively small compared to the load change $\Delta Fa$ of a helical type spring having a linear load versus deflection response, as represented by curve Y in the graph of FIG. 5. Accordingly, the desired handbrake force is maintained relatively constant irrespective of such shifting of a car body relative to its truck as would create a loss of handbrake force absent the benefit of applicant's invention.

It will be further noted that in order to minimize operation of the handwheel device in applying the handbrakes through the intermediary of tension member 1 in handbrake chain 3, body members 45 and 51 may adjusted axially by reason of their screw-threaded connection in order to pre-load elastic member 53 such that the deflection of individual disc springs 55 is approximately 65% corresponding to the lower limit of the "constant load" range of these disc springs 55. This reduces handwheel operation by eliminating the need to operate the handwheel to initially compress elastic member 53 an amount corresponding to the total deflection of the plurality of disc springs 55 between 0-65% deflection.

Figure 6:
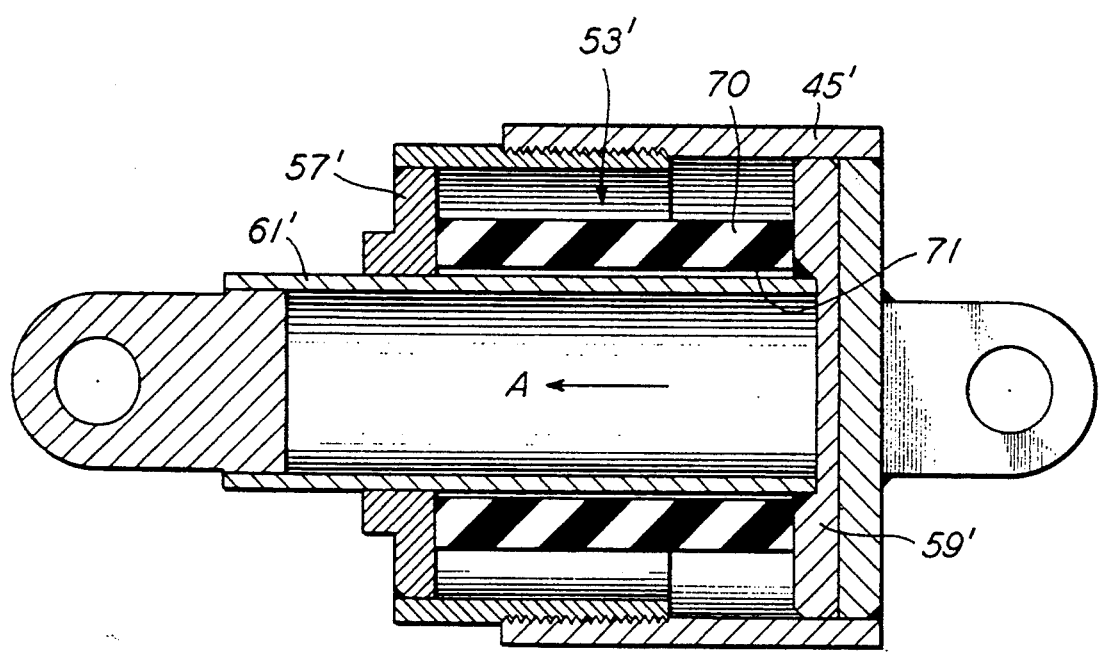
FIG. 6 is a sectional assembly view of an alternate embodiment of the tensioning device of FIG. 1.

In the alternate embodiment of the invention, as shown in FIG. 6, an elastic member 53' is employed, which may be in the form of at least one elastomeric element 70. This elastomeric element 70 is housed within a body 45' that is similar to body 45 in which the elastic member 53 comprising Belleville springs 55 is housed. Elastomeric element 70 is generally cylindrical in shape with axially extending, central opening 71 through which the handbrake chain pull rod 61 passes. One end of elastomeric element 70 engages end wall 57' to which the handbrake lever 31 is connected, while the other end engages seat 59' to which pull rod 61 is connected. In this manner, elastomeric element 70 is compressed, as the handbrake chain 3 is taken up, the force of compression maintaining tension on the handbrake chain.

Elastomeric element 70 is molded preferably from a polyester compound in the thermo-plastic class and exhibits a relatively constant load characteristic as the compressed elastic member 53' expands through a predetermined range of travel in order to maintain the handbrake force within minimum limits, in the event shifting occurs between the car body 8 and the car truck on which brake assembly 5 is mounted.

We claim:

1. A handbrake system for railway car brake apparatus in which at least one member of said brake apparatus is mounted on the truck of said railway car comprising:
   (a) a handbrake lever operably connected to said brake apparatus for effecting a brake application on said railway car;
   (b) actuating means mounted on the body of said railway car for applying a handbrake force to said handbrake lever to effect said handbrake application; and
   (c) tensioning means between said handbrake lever and said actuating means via which said handbrake force is transmitted to said handbrake lever including at least one disc spring for maintaining said handbrake force substantially constant during shifting of said railway car body relative to the truck thereof, said at least one disc spring being characterized by a non-linear load versus deflection curve predicted on a predetermined height to thickness ratio of said at least one disk spring, said non-linear load versus deflection curve having a substantially constant load region in which said substantially constant handbrake force is established through a range of deflection of said at least one disc spring between 65%-85%.

2. A handbrake system as recited in claim 1, wherein said at least one disc spring is a plurality of disc springs stacked together in a series configuration.

3. A handbrake system as recited in claim 2, wherein the size and shape of said plurality of said disc springs are identical.

4. A handbrake system as recited in claim 1, wherein said tensioning means further comprises:
   (a) a housing connected at one end to said handbrake lever;
   (b) an axially movable spring seat in said housing;
   (c) said at least one disc spring in said housing between said spring seat and another end of said housing; and
   (d) a pull rod connected at its one end to said spring seat and projecting through said housing at said another end thereof, said pull rod at its other end connected to said actuating means.

5. A handbrake system as recited in claim 4, wherein said housing comprises:
   (a) a first portion having said one end of said housing;
   (b) a second portion separate from said first portion and having said opposite end of said housing;
   (c) means between said first and second portions for adjusting the axial dimension between said one and said opposite ends to thereby pre-tension said at least one disc spring.

6. A handbrake system as recited in claim 1, wherein said tensioning means comprises:
   (a) a handbrake chain having one end connected to actuating means; and
   (b) said elastic member connected between said handbrake lever and the other end of said handbrake chain.

7. A handbrake system as recited in claim 6, wherein said elastic member comprises:
  (a) a housing connected at one end to said handbrake lever;
  (b) a spring seat disposed in said housing adjacent said one end thereof for axial movement in said housing;
  (c) at least one disc spring in said housing having opposite ends bearing against said spring seat and the end of said housing opposite said one end;
  (d) an opening in said opposite end of said housing; and
  (e) a pull rod operatively disposed in said opening, one end of said pull rod being connected to said spring seat and the other end thereof connected to the other end of said handbrake chain, whereby said at least one disc spring is loaded under compression between said spring seat and said opposite end of said housing in accordance with operation of said actuating means to provide said handbrake force.

8. A handbrake system as recited in claim 7, wherein said housing comprises:
  (a) a first portion having said one end of said housing;
  (b) a second portion having said opposite end of said housing;
  (c) said first and second portions having screw-threaded engagement therebetween to adjust the axial dimension between said one and said opposite ends and thereby pre-load said at least one disc spring independently of said operation of said actuating means.

9. A handbrake system as recited in claim 8, wherein said at least one disc spring is a plurality of disc springs arranged in a series configuration, said plurality of disc spring having a predetermined range of deflection in which said load under compression is substantially constant.

* * * * *